E. JAEGER.
PERIODICAL SPEED INDICATOR.
APPLICATION FILED MAY 24, 1916.

1,413,278.

Patented Apr. 18, 1922.
13 SHEETS—SHEET 1.

Inventor:
Edmond Jaeger
By Attorneys,
Fraser, Tink & Myers

E. JAEGER.
PERIODICAL SPEED INDICATOR.
APPLICATION FILED MAY 24, 1916.

1,413,278.

Patented Apr. 18, 1922.
13 SHEETS—SHEET 2.

Inventor:
Edmond Jaeger
By Attorneys,
Fraser, Tuck & Myers

E. JAEGER.
PERIODICAL SPEED INDICATOR.
APPLICATION FILED MAY 24, 1916.
1,413,278.
Patented Apr. 18, 1922.
13 SHEETS—SHEET 3.
Fig. 2.ª
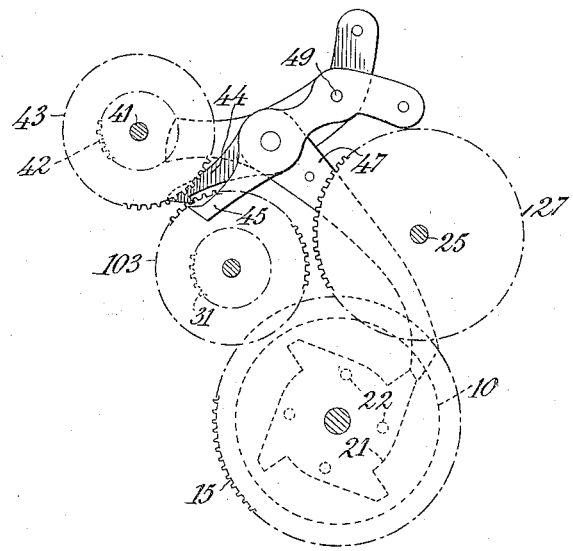
Fig. 5.ª
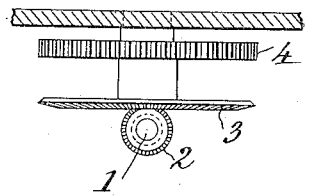
INVENTOR
Edmond Jaeger
BY
Fraser, Durk & Myers
ATTORNEYS

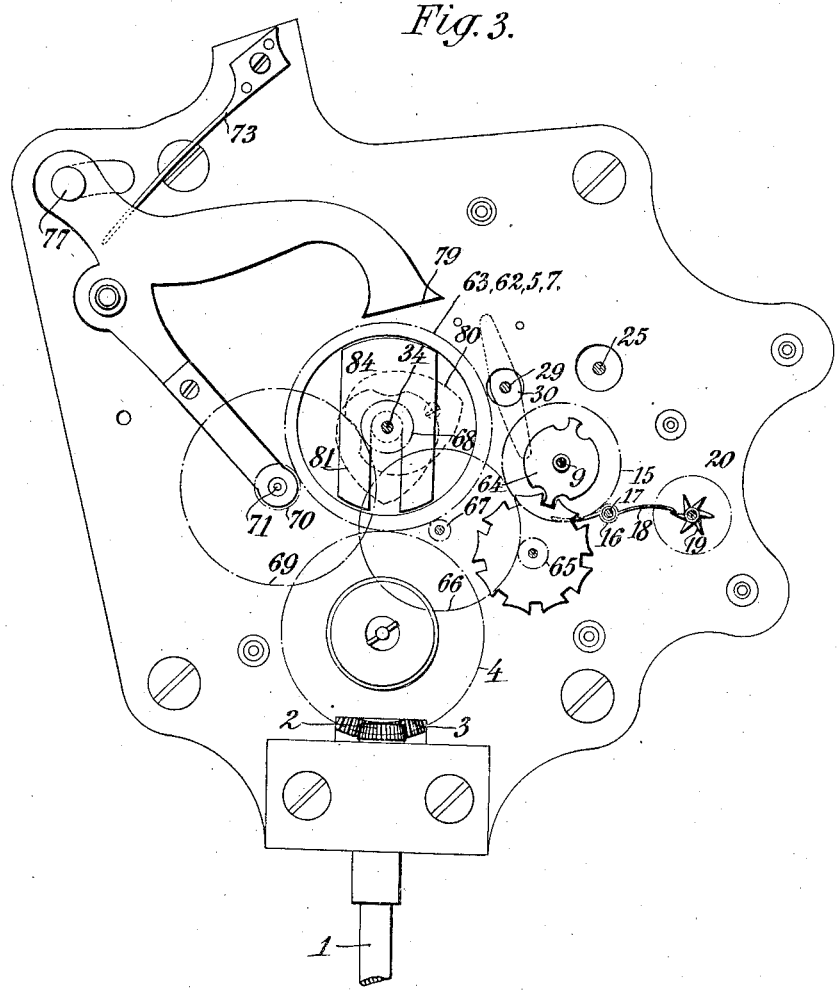

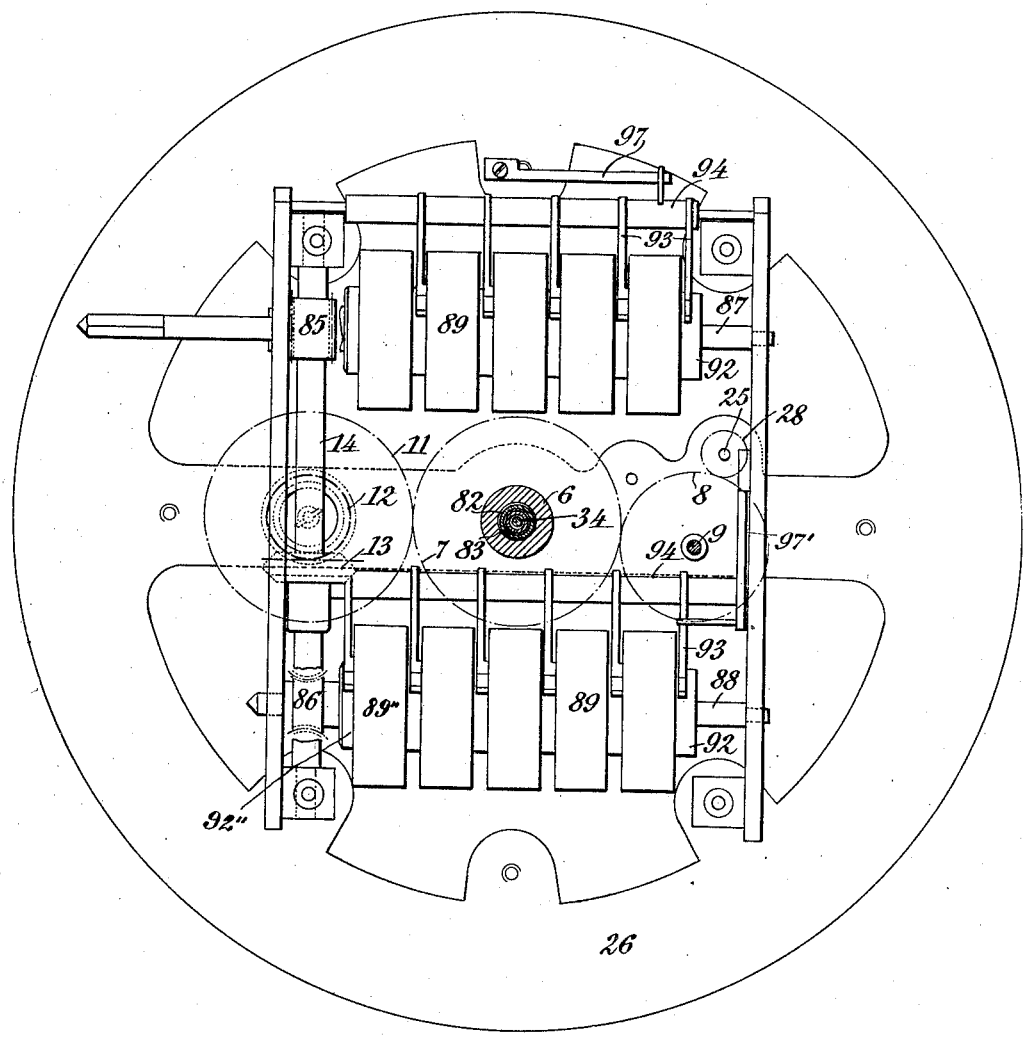

E. JAEGER.
PERIODICAL SPEED INDICATOR.
APPLICATION FILED MAY 24, 1916.

1,413,278.

Patented Apr. 18, 1922.
13 SHEETS—SHEET 6.

Inventor:
Edmond Jaeger
By Attorneys,
Fraser, Tink & Myers

E. JAEGER.
PERIODICAL SPEED INDICATOR.
APPLICATION FILED MAY 24, 1916.

1,413,278.

Patented Apr. 18, 1922.
13 SHEETS—SHEET 7.

Inventor:
Edmond Jaeger
By Attorneys,
Fraser, Spink & Myers

E. JAEGER.
PERIODICAL SPEED INDICATOR.
APPLICATION FILED MAY 24, 1916.

1,413,278.

Patented Apr. 18, 1922.
13 SHEETS—SHEET 8.

Inventor:
Edmond Jaeger
By Attorneys,
Fraser, Turk & Myers

E. JAEGER.
PERIODICAL SPEED INDICATOR.
APPLICATION FILED MAY 24, 1916.
1,413,278.
Patented Apr. 18, 1922.
13 SHEETS—SHEET 9.
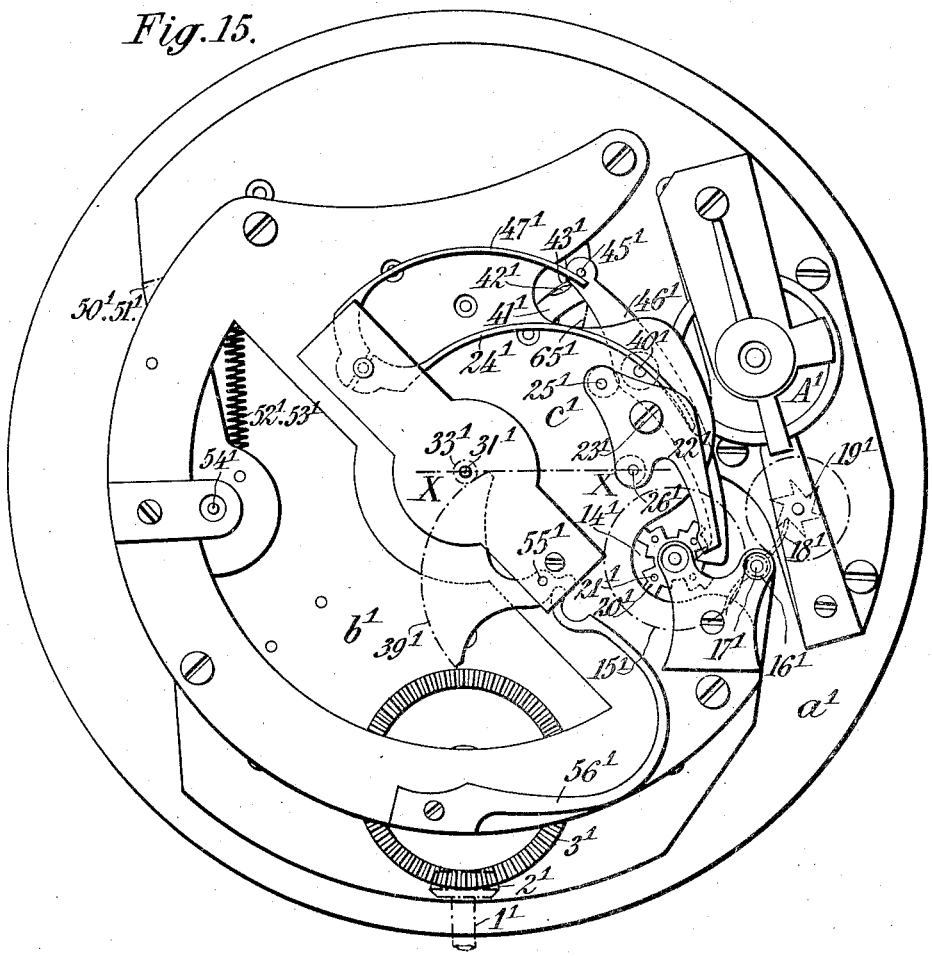
Fig. 15.
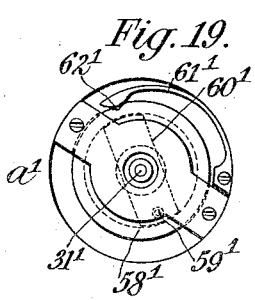
Fig. 19.
Fig. 18.
Inventor:
Edmond Jaeger
By Attorneys,
Fraser, Tusk & Myers

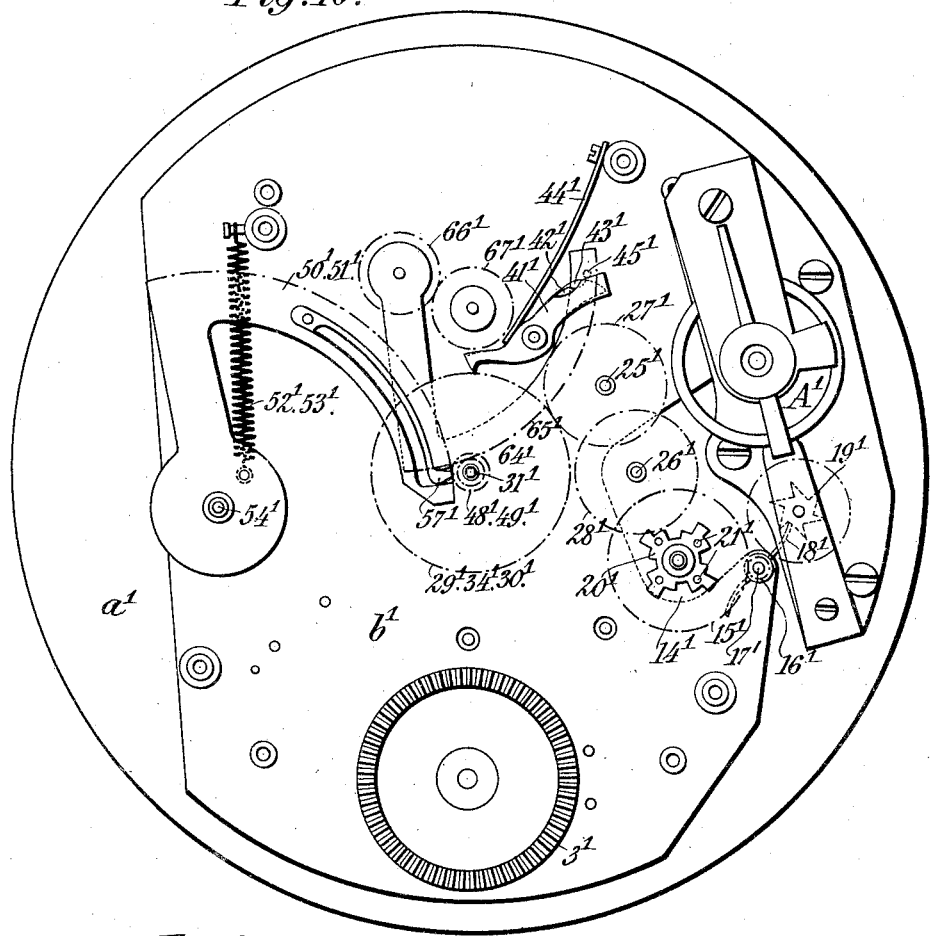
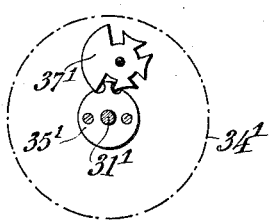

E. JAEGER.
PERIODICAL SPEED INDICATOR.
APPLICATION FILED MAY 24, 1916.

1,413,278.

Patented Apr. 18, 1922.
13 SHEETS—SHEET 11.

Inventor:
Edmond Jaeger
By Attorneys,
Fraser, Turk & Myers

E. JAEGER.
PERIODICAL SPEED INDICATOR.
APPLICATION FILED MAY 24, 1916.

1,413,278.

Patented Apr. 18, 1922.
13 SHEETS—SHEET 12.

Inventor
Edmond Jaeger
By Attorneys,
Fraser, Fink & Myers

E. JAEGER.
PERIODICAL SPEED INDICATOR.
APPLICATION FILED MAY 24, 1916.

1,413,278.

Patented Apr. 18, 1922.
13 SHEETS—SHEET 13.

Inventor:
Edmond Jaeger
By Attorneys,
Fraser, Pink & Myers

UNITED STATES PATENT OFFICE.

EDMOND JAEGER, OF PARIS, FRANCE.

PERIODICAL SPEED INDICATOR.

1,413,278.  Specification of Letters Patent.  Patented Apr. 18, 1922.

Application filed May 24, 1916. Serial No. 99,700.

*To all whom it may concern:*

Be it known that I, EDMOND JAEGER, a citizen of the Republic of France, residing in Paris, France, have invented certain new and useful Improvements in Periodical Speed Indicators, of which the following is a specification.

This invention relates to a periodical speed indicator capable of being combined with a time indicator, a counter and a totalizer, such speed indicator being based on the following theoretical considerations:

The speed indicating hand occupies periodically positions corresponding to angular distances proportional to the speed to be measured according to the formula $e = v\,t'$, in which $t'$ indicates equal periodical intervals of time.

To that end the mechanism which actuates the index hand is coupled in during intervals of time $t'$, all equal among themselves, and disconnected during periods $t^2$, likewise equal among themselves and equal to $t'$, the connections and disconnections following each other alternately, and said periods $t'$ and $t^2$ being capable of being very short—in practice, e. g., of 1 or 2 seconds' duration.

The apparatus consists essentially of a speed regulating mechanism formed by an escapement similar to that of watches and receiving its movement from the prime mover the speed of which is to be measured, and of a mechanism for the control of the speed indicating hand.

This mechanism, which is actuated by such prime mover, is connected by means of a barrel which executes an intermittent movement of rotation and of a whip lever controlled by the barrel acting on the escapement wheel of the speed regulating mechanism, the effect of which is, on the one hand, to actuate said regulating mechanism, and, on the other hand, to regulate the intermittent movement of rotation of said barrel, which actuates two pawls executing regular periodical movements, one of which causes the intermittent connection and disconnection of the mechanism of the speed measuring hand, and the other of which is formed of two pawls or brakes or other similar means insuring successively and alternately, during the first phase of the disconnection, the locking of the mechanism actuating the index hand which is continuously compelled to return to its starting position, and, during the second phase of the disconnection and the subsequent connection, the locking of the hand, likewise compelled to turn back and strike against an element of the hand actuating mechanism, so that said hand if pushed beyond its former position is stopped in such position, while if stopped before it reaches its former position it turns back until it strikes against an element of the actuating mechanism, which is locked during the required time.

This speed indicating mechanism is capable of being combined with a time indicating mechanism, similar to that of watches, which consists in superposing on the dial a small hand and a large hand, both actuated through suitable gearing by the prime mover the speed of which is to be measured, and subject to the regulating action of the escapement of the regulating mechanism.

This mechanism may also comprise a special zero-setting device for the time indicator or watch—i. e., for the hour and minute hands which are capable of moving over the same dial as the speed indicating hand.

This speed indicating mechanism is described below with reference to the annexed drawings.

Fig. 1 is a rear view of the apparatus.

Figs. 2, 3 and 4 are similar views in which the following parts have successively been removed: Fig. 2, the first plate; Fig. 3, the zero-setting sectors, the actuating mechanism of the speed indicating hand and the barrel of the clock movement; Fig. 4, the second plate.

Fig. 2ª is an enlarged detail of a part of Fig. 2.

Figs. 5 and 6 are transverse sections in different planes, Fig. 5 showing the control of the barrel of the clock movement, and Fig. 6 the control of the speed indicating hand.

Fig. 5ª is a fragmentary section showing parts that are beneath the plane of the section in Fig. 5.

Fig. 15 is a rear view of the apparatus.

Fig. 16 is a similar view, with the rear plate and the parts which it carries removed.

Fig. 18 is a partial transverse section on line X—X of Fig. 15.

Fig. 19 shows separately, in front view, the device insuring the stability of the hand, the latter being assumed to have been removed.

Figs. 20, 21 and 22 show separately the pawls of the wheels which regulate the displacements of the speed indicating hand.

Fig. 23 shows the device connecting said wheels together.

Figure 24:
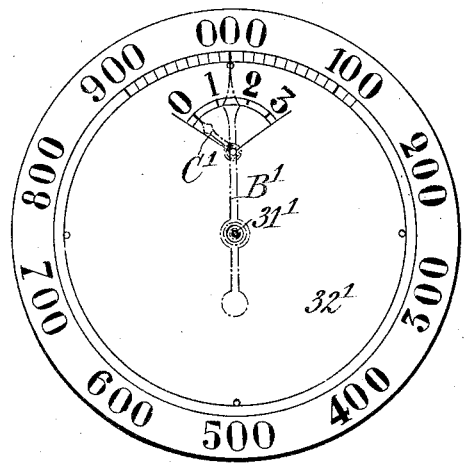
Fig. 24 is a front view of the dial.
Figure 27:
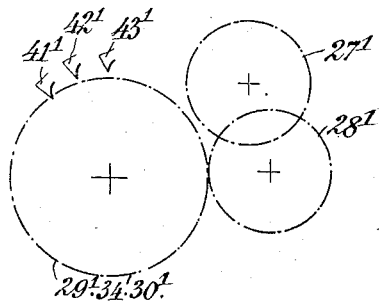
Figure 28:
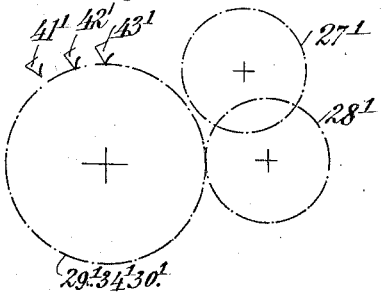

All the figures, except Fig. 24, are drawn on an enlarged scale.

Figure 29:
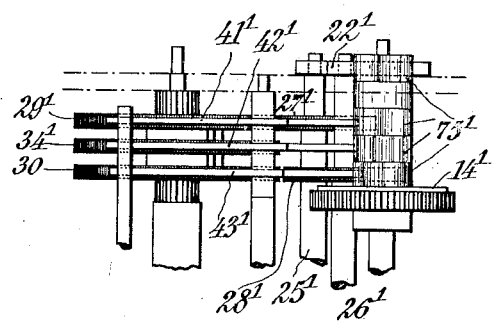
Figure 30:
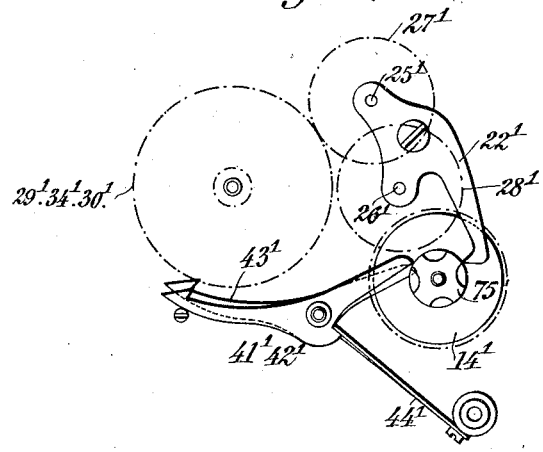

Figs. 29 and 30 show a modification of the timing cams.

Fig. 29 is an elevation of the modified part.

Fig. 30 is a plan of the same.

The movement of the motor is transmitted to the counter, with or without reduction, by means of a shaft 1 carrying a bevel pinion 2 meshing with a bevel gear 3, having on the side a spur gear 4 (Fig. 3) which meshes with another central spur gear 5 fast on a sleeve 6, (Fig. 5) driving also another toothed wheel 7 (Figs. 4, 5 and 6) also fast on the sleeve 6.

Said wheel 7 meshes on the one hand with a toothed wheel of smaller diameter 8, (Figs. 4 and 5) keyed on a shaft 9 which is parallel with the sleeve 6 and controls a barrel 10, the intermittent movement of which will be explained below.

Said wheel 7 meshes on the other hand with a toothed wheel 11 secured to a bevel pinion 12 which meshes with another bevel pinion 13 keyed on a horizontal shaft 14 which drives the day counter and the total counter (Figs. 4 and 5) as will be explained below.

The shaft 9 carries, as stated, a barrel 10 which is connected with the shaft 9 by a spiral spring, one end of which is fastened to the shaft and the other end of which bears on the inner circular wall of the barrel, forming a yielding friction drive.

Figure 2:
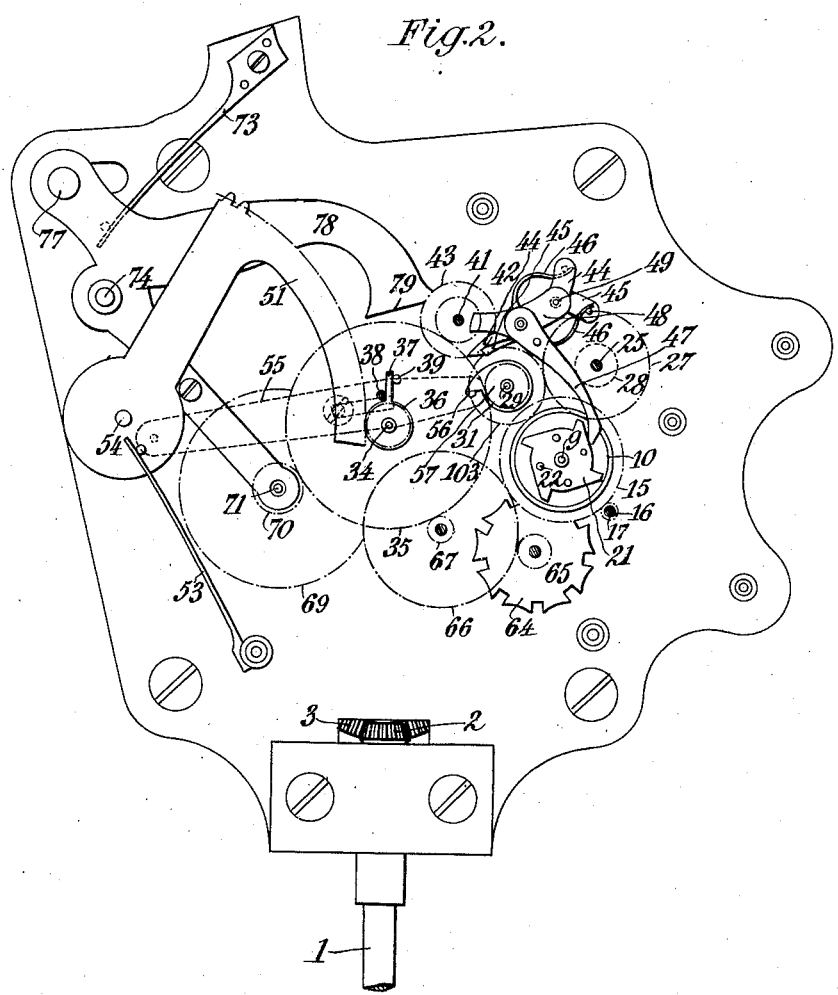
Figure 5:
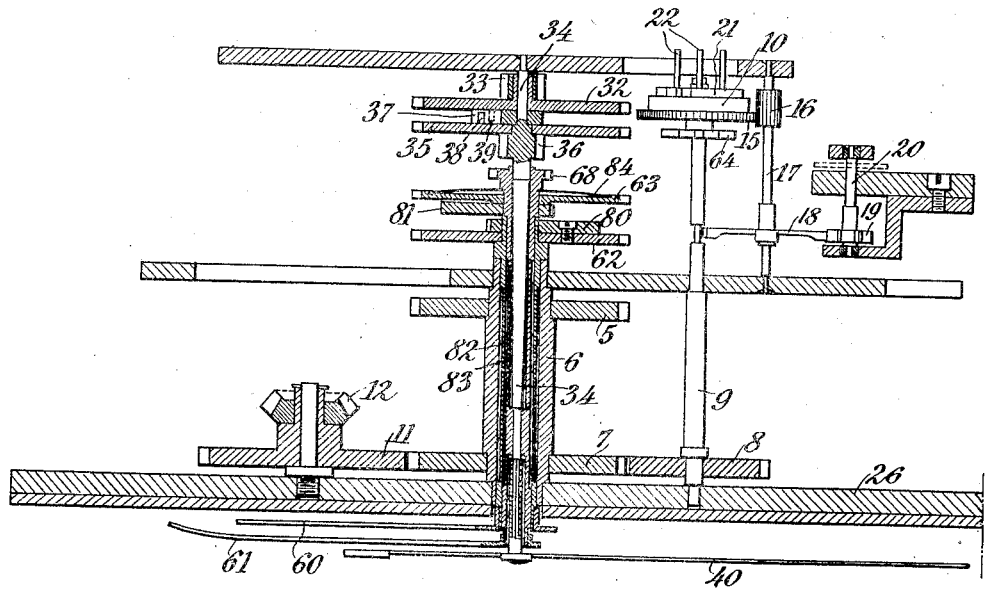

The barrel 10 carries on the outside a toothed wheel 15 which meshes with a pinion 16 keyed on a spindle 17 (Fig. 5) carrying a lever (whip) 18 which acts on the teeth of a star wheel 19 (Fig. 3) keyed on the spindle 20 of the shaft of the escapement wheel of the regulating mechanism similar to that of watches and having in the usual manner a pallet and a spiral balance (Figs. 2, 3 and 5).

The barrel 10 is surmounted by a cam 21 (Figs. 1, 2 and 5), which carries studs 22 forming a sort of lantern pinion.

Said studs, upon the intermittent movement imparted to the barrel as a result of the escape movements of the lever 18, cause the rocking of a bellcrank lever 23 (Fig. 1), returned by a flat spring 24.

Said bellcrank carries at its end opposite that bearing on the studs 22, one end of a spindle 25, the opposite end of which is pivotally mounted with a certain play (Fig. 6) in the main plate 26.

Said spindle carries a light steel gear 27 having very fine teeth and at its lower end a pinion 28 which meshes with the wheel 8 (Figs. 2, 4 and 6) which imparts to said spindle 25 its movement of rotation.

Figure 6:
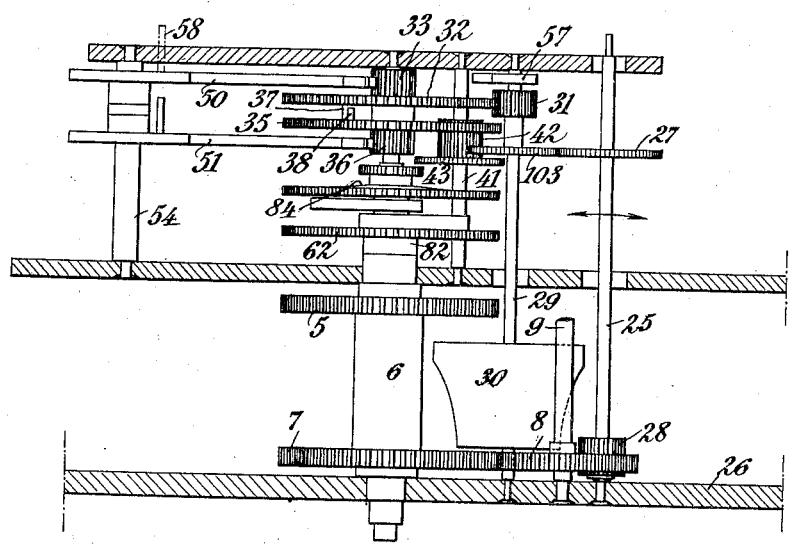
Figure 8:
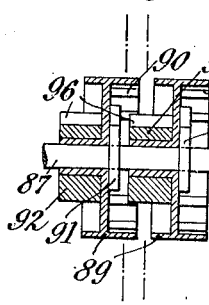
Figs. 8, 9 and 10 are details of the device controlling the drums of the counters.

It will be seen that said spindle 25, by reason of the displacements due to the rocking of the lever 23, executes periodical oscillatory movements which move it to and fro in the direction indicated by the double arrow (Fig. 6).

Said oscillatory movements of spindle 25 have the effect of causing, in one direction, the engagement of the gear 27 with the light fine-toothed steel wheel 103 carried by a spindle 29 parallel with the spindle 25, and in the other direction the disengagement of said wheel 27 from the wheel 103.

Said spindle 29 carries moreover a fan 30 forming an air brake, the object of which is to retard the rotary movement upon the return to zero, as will be seen below.

Figure 1:
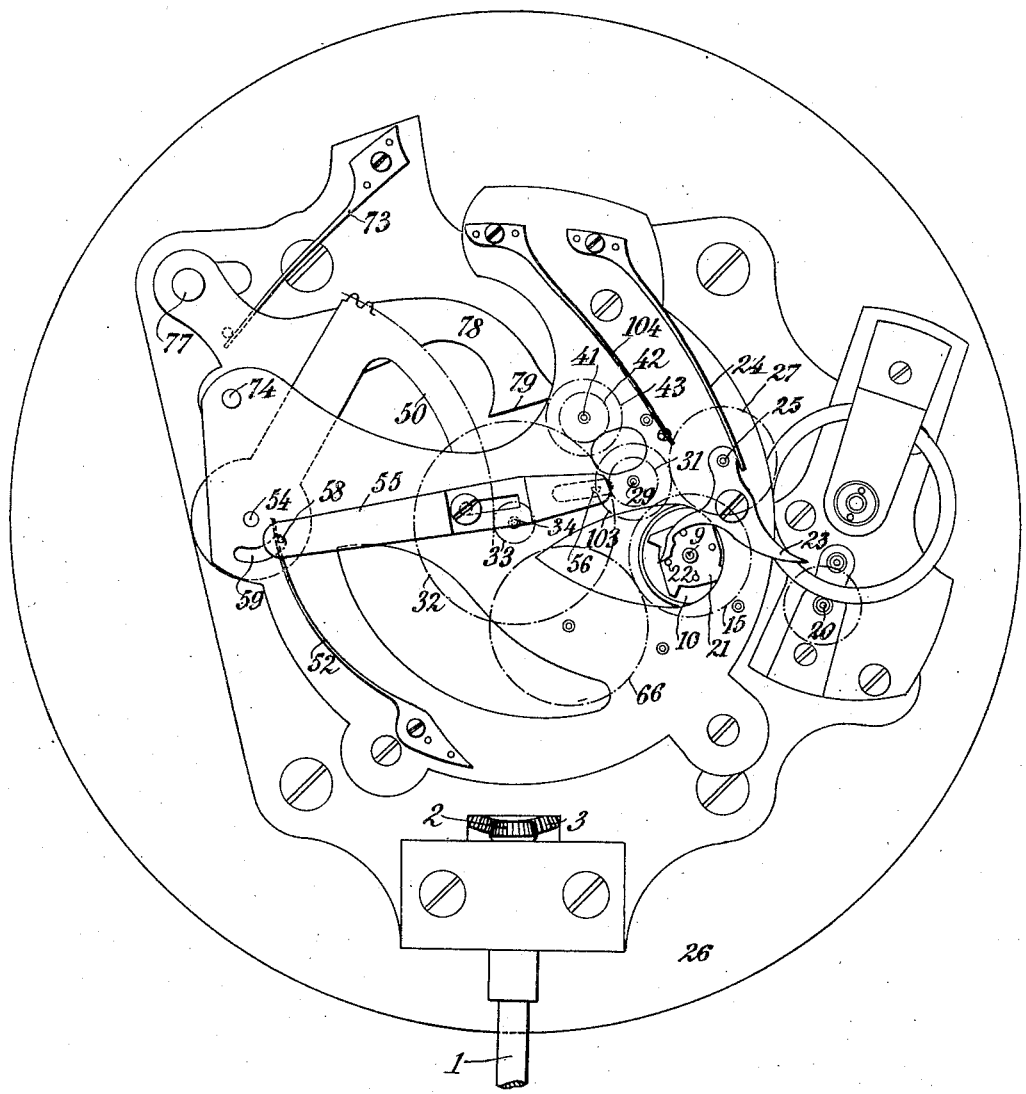

Moreover the spindle 29 carries in its upper part a pinion 31 which meshes with a toothed wheel 32 secured to a pinion 33, which is capable of rotating loosely on the central shaft 34, being the shaft of the hand (Figs. 1, 5 and 6).

Said shaft has also keyed to it another toothed wheel 35 of the same diameter as the wheel 32 and is provided with a pinion 36 cut into it or keyed upon it so that the wheel 35 and the pinion 36 are fast to each other.

Between the two wheels 32 and 35 an engaging member 37 is located which is mounted loosely on the shaft 34 and arranged between two driving pins 38 and 39 secured respectively to the wheel 35 and to the wheel 32 (Figs. 2 and 5).

Figure 12:
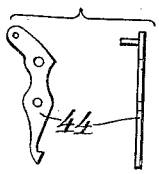
Figs. 12 and 13 show separately the coupling pawls.
Figure 13:
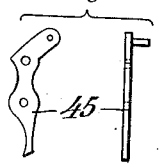
Figure 14:
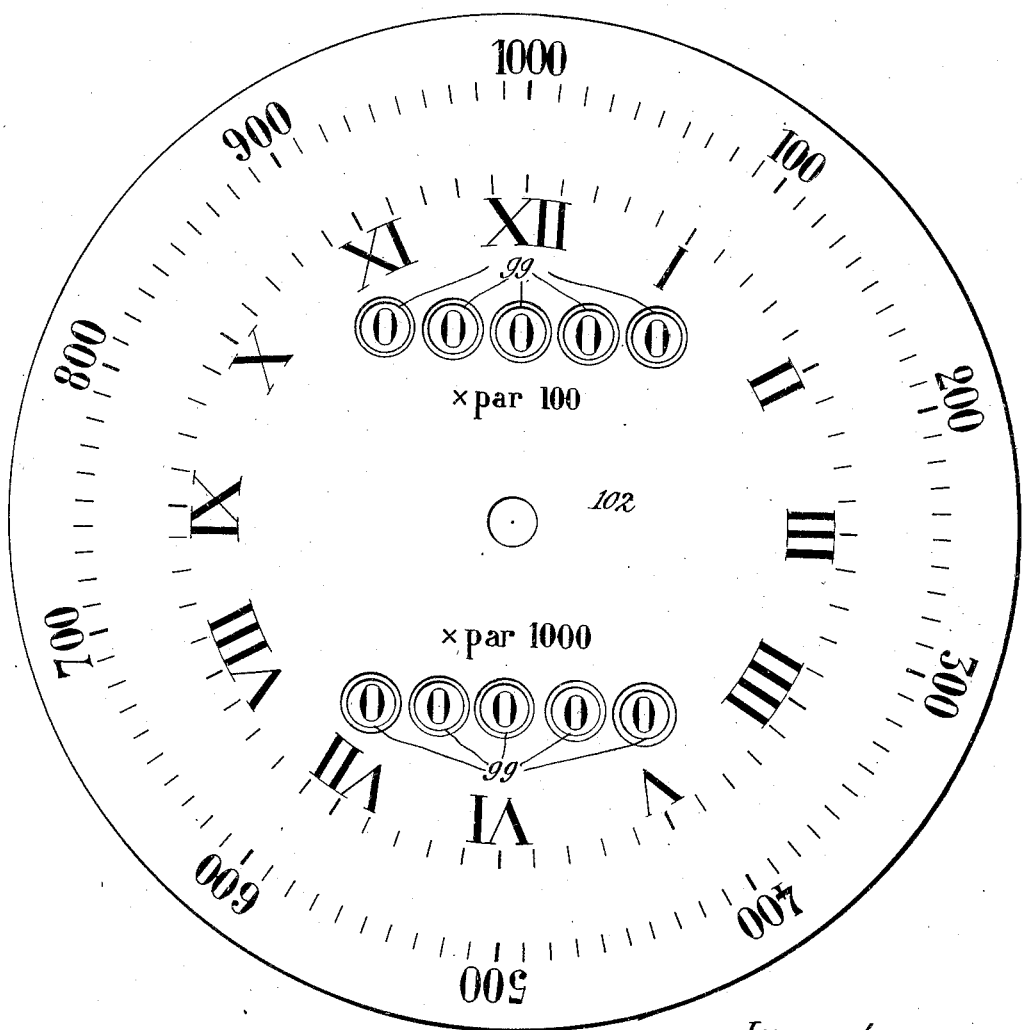
Fig. 14 shows the dial over which the different hands travel.
Figure 17:
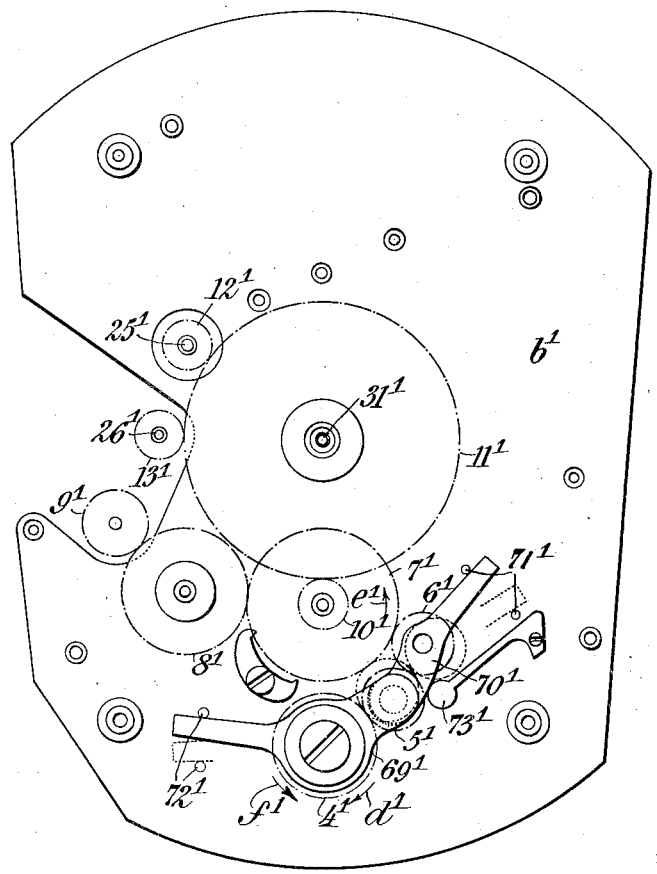
Fig. 17 is a front view of the apparatus, with the index hand, the dial, the front plate and the parts which the latter carries removed.
Figure 25:
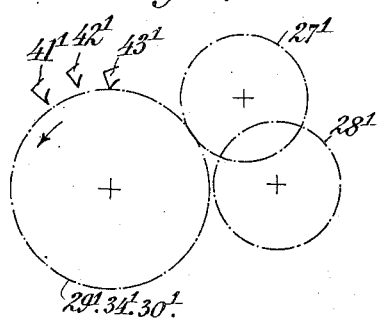
Figs. 25, 26, 27 and 28 are diagrammatic views showing the different phases of the operation of the mechanism for actuating the speed indicating hand.
Figure 26:
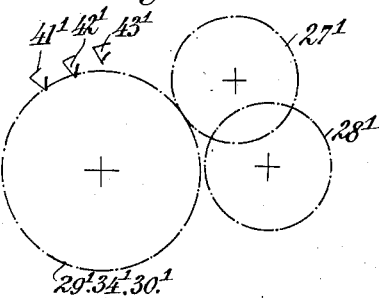

Parallel with the spindles 29 and 25 another spindle 41 (Fig. 6) is arranged on which are keyed a pinion 42 meshing with the wheel 35 and a toothed wheel 43. On the wheels 43 and 103 act respectively two pawls 44 and 45 (Figs. 2, 12, and 13). A double spring 46 presses both pawls toward these wheels.

Said pawls are controlled by a rocking arm 47, returned by a spring 104, a lever 48 and a pin 49, vibrated by the cam 21 secured to the barrel 10 (Fig. 2) so that the two pawls act alternately on their wheels.

The movement is transmitted to the wheel 32 by the pinion 31, and 32 drives in its turn by means of the engaging piece 37 and pins 38 and 39 the toothed wheel 35 and hence the shaft 34 and the index hand 40.

With the pinions 33 and 36 mesh two sectors 50 and 51, returned by springs 52 and 53, pivotally mounted on a spindle 54 held between two of the plates of the apparatus.

In its displacement the sector 50 controls a link 55 terminating in a stud 56 designed to serve as a stop for a snail 57 keyed on the spindle 29, when the driving wheel 32 of the engaging piece 37 is returned to zero.

At the beginning of the period of connection the link 55 is carried along by the sector 50 by means of a pin 58 located eccentrically relative to its pivotal shaft 54 and working in a slot 59 provided in the rear plate concentrically with said pivotal shaft.

The object of the displacement of the link 55 is to move the stud 56 away from the snail 57 in order to enable the passage of the latter during the period of connection.

The operation of the mechanism which controls the speed indicating hand 40 is as follows:

The movement of the prime mover, the speed of which is to be ascertained, is communicated from the shaft 1 through the described intermediate gearings 2, 3, etc., to the spindles 9 and 25 which revolve continuously at speeds corresponding to those of the prime mover. The spindle 9 in turn drives frictionally the barrel 10 which turns intermittently at a slower speed synchronized by the escapement, so that it constitutes the time-measuring element of the mechanism. By the action upon the lever 23 of the pins 22 carried by the barrel 10, the spindle 25 is displaced periodically to bring its toothed wheel 27 alternately into and out of mesh with the wheel 103. When in mesh the wheel 32 is driven forward at a speed proportional to the speed of the prime mover for the time being. If the position of the hand 40 corresponds to a lower speed the wheel 32 will at some point in its movement pick up through the loose piece 37 the wheel 35 and drive the latter and spindle 34, and the hand, until the latter is advanced to a point on the dial indicating the speed of the prime mover during the time interval while the gears 27 and 103 remain in mesh. At the end of this time interval, and when the hand 40 reaches this indicating position, the gears are unmeshed by the opposite movement of the lever 23 and shaft 25.

The engagement and disengagement of the pawls 44, 45 with their respective toothed wheels 103 and 43, is accomplished in corresponding time intervals by the action upon the levers 47, 48 of the cam 21 carried by the barrel 10. The relation of the periods of engagement of these pawls with respect to the periods of meshing and unmeshing of the gears 27 and 103 is such that the operation of the instrument resolves itself into three phases, viz:—

*First phase.*—At the beginning of this phase the wheel 32 is at its starting position, and the wheel 35 is held locked by its pawl 45. The spindle 25 is displaced to the left (Fig. 6) so that wheel 27 comes into mesh with and drives wheel 103, and thence drives toothed wheel 32 to an angular distance from its zero or starting position, which is greater or less according to the speed of the prime mover. If this angular advancement is greater than that during the preceding first phase, this excess movement is transmitted through the engaging piece 37 to the wheel 35 and thence to the hand 40. During all of this phase the pawl 45 is in contact with the ratchet 43 so that it locks the wheel 35 and holds the hand stationary except for a movement which may be communicated through the piece 37 to advance the hand, to which movement the pawl will yield.

*Second phase.*—This phase begins at the moment of the unmeshing of the wheels 27, 103, at which instant the pawl 44 is brought into contact with the wheel 103 to hold the latter stationary, and the pawl 45 is separated from the ratchet 43; the result is that the wheel 35 is released and the wheel 32 locked. Thereupon the stress of the spring 53 is effective to rotate (through 51 and 36) the wheel 35 backward, carrying with it the hand 40. which moves toward zero until stopped by the arresting of the wheel 35 by the piece 37 according to the angular displacement of the latter during the first phase.

*Third phase.*—This phase begins in the middle of the period while the wheels 27 and 103 are unmeshed, and is effected by an opposite displacement of the pawls, so that the wheel 35 is locked and the wheel 32 is released. This wheel is then returned to its starting or zero position by the stress of its spring 52 (acting through 50 and 33), the movement being moderated by the fan 30.

The correction of the showings of the hand in a preceding period takes place during the first phase. When the speed is increased the wheel 32, by means of the engaging piece 37, drives the hand 40 beyond the position which it occupied before.

On the other hand, when the speed is reduced the wheel 32, having been displaced angularly through an amount less than the preceding amount and being locked at the beginning of the second phase by the pawl 44, while the wheel 35 is released, will enable the latter to return toward zero until its pin 39 strikes against the engaging piece, held by the pin 38 of the wheel 32.

Thus the apparatus works on the following principle: A time measuring device marks off the periods of connection and disconnection. During each period of connection (first phase) the prime mover, whose speed is to be determined, drives the movable part (32) a greater or less distance from its starting point proportional to the speed of the prime mover during said period. During the period of disconnection, said moving part is first held locked in its final position (second phase) while the hand or indicating element is unlocked; then during the remainder of the period of disconnection, (third phase) the hand is locked, while the moving part (32) is released and thereupon returns to its starting point. The speed is measured by the extent of movement of the moving part during the first phase; if this exceeds the previous extent of movement it pushes the hand or indicating part ahead a proportionate distance; if it falls short of the position attained in the previous movement, it does not reach the hand, and the latter, when released during the second phase, drops back to the position determined by the extent of movement of the moving part. Thus the hand is moved forward or backward as the speed rises or falls.

The dial 102 is divided into 100 equal parts, each representing 10 revolutions of the shaft the speed of which is to be measured. A displacement of the hand 40 equal to a complete rotation thus corresponds to a speed of 1000 revolutions per minute. However, owing to its driving device the hand is capable of effecting a greater displacement almost equal to two turns of the dial, which enables speeds to be measured which amount to nearly 2000 revolutions a minute.

By changing the ratios of the gears according to the purpose for which the apparatus is intended the dial may of course have different graduations from those mentioned.

The hands 60 and 61 which indicate the time of operation in hours and minutes are controlled by means of the shaft 82 and the toothed wheel 62 for the hours and of the shaft 83 and the wheel 63 for the minutes. The movement is transmitted from the shaft 9 to wheel 63 by means of a Maltese cross 64 (Fig. 3) and gears 65, 66 and 67 as shown in the drawing (Figs. 2 and 3) or by means of gears alone. The ratio between the minute wheel 63 and the hour wheel 62 is obtained by reducing gears 68, 69 and 70. The gears 69 and 70 are mounted on one and the same spindle 71 carried by a lever arm 72 returned by a spring 73 capable of pivoting at 74 under the action of a pushing device 75 acting on a pin 77. The pushing device 75 is actuated from the outside by means of a knurled button 76 mounted on the square end of the shaft of the day counter and serving besides to return said counter to zero. The lever arm 72 carries also a prolongation or hammer 78 capable of acting by means of its face 79 on the heart cams 80 and 81, which are secured respectively to the wheel 62 keyed on the shaft 82 and to the shaft 83 (Figs. 3, 5 and 7).

Figure 7:
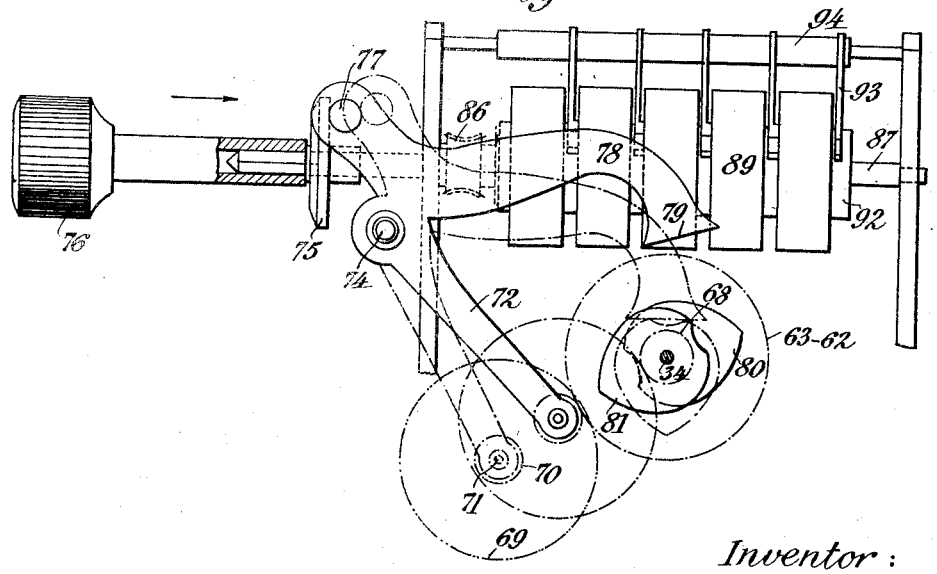
Fig. 7 is a detail of the zero-setting device of the day counter and of the hour hand.

When the hands 60 and 61 are to be returned to zero the pusher 76 is moved in the direction of the arrow (Fig. 7). The effect of this movement is first to separate the gears 69 and 70 from the gears 68 and 62 and hence to break off all connection between the minute wheel and the hour wheel. The hammer 78 then exerts a pressure on the heart cams 80 and 81, which, whatever may be their position, then come to occupy the position indicated by dot-and-dash lines in Fig. 7, corresponding to the zero position of the hands.

The toothed wheel 63 is loosely mounted on its shaft 83 and drives the latter by means of a friction spring 84 (Fig. 5). This arrangement has been adopted to enable the minute hand to be returned to zero without the necessity of disconnecting the gears 63 and 67.

The day counter and the total counter are driven by the shaft 14 through worms, (one worm 85 being shown), and helicoidal gears, (one gear 86 being shown) keyed respectively on spindles 87 and 88 on which the numeral drums 89 are mounted (Fig. 4).

Figure 10:
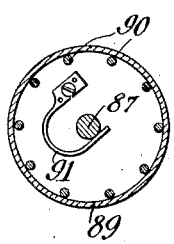

Each drum 89 carries on its periphery ten studs 90 (Fig. 10), uniformly spaced, and is loosely mounted on its shaft 87 or 88 with which it is connected by a resilient connection formed by a friction spring 91 fastened to one of its sides. The end of said spring presses against the shaft.

On the side opposite the spring the drum is prolonged by a cam 92 of any suitable profile, which acts on an arm 93 pivotally mounted on an outer shaft 94 parallel with the main shaft. Said arm 93 normally locks the drum of the next higher units by means of a lateral projection 95 with which it is fitted and which passes underneath said drum and forms a stop for one of its studs (Figs. 4, 8, 9 and 10).

With this arrangement, when any one of the drums marks zero the notch 96 of the cam 92 has just left the lever 93, which is raised. It will be understood that when the drum has completed a rotary movement in the direction of the arrow $a$ (Fig. 9) equal to $\frac{9}{10}$ of a revolution, the lever 93 will drop into the notch 96, releasing the stud of the drum of the next higher units, which will then be carried along by means of the spring 91 by the shaft 87 or 88 through a distance equal) to $\frac{1}{10}$ of a revolution, the lever 93 holding back the next stud under the action of the cam 92 when this displacement is accomplished.

Instead of using studs for the purpose of holding back the drums, as described above, the same result may be attained by effecting the holding back action upon the drum itself, which would to that end be suitably milled so as to form projections or stop playing the same part as the studs.

In the example shown the total counter designed to totalize the showings of the day counter registers only the tens marked by said counter.

In order to secure accurate data it is therefore necessary to multiply the number shown by said totalizing counter by 10.

If, as in the apparatus described, instead of registering directly the revolutions of the shaft the speed of which is to be measured, only the hundreds of revolutions of said shaft are registered, it will be necessary to multiply the showings of the day counter by 100 and those of the total counter by 1000.

To that end the units drum 89' (Fig. 4) of the day counter is driven directly by its shaft 87, while that of the total counter is driven only one-tenth of a rotation at each revolution of the shaft. This result is attained by omitting the lever 93 in the case of the units drum 89' of the day counter. In the case of the total counter the cam 92" for the units drum 89", which is identical with the other cams 92, is however keyed on the shaft 88.

In each counter the object of the lever 93 of the highest units drum is merely to hold said drum in the proper position upon the return to zero. Said lever, which is not maintained like the others by an adjacent drum, is kept in contact with the cam 92 by a spring 97 or 97'.

Figure 9:
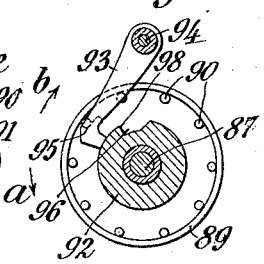

The day counter alone can be returned to zero without taking the apparatus apart. Such return to zero is effected by turning the knob 76 in the direction of the arrow $b$ (Fig. 9). The levers 93 then drop successively into their respective notches, where they are held pressed against the face 98 of the latter. When all the levers are in this position it is only necessary slightly to turn the knob 76 in the direction opposite the preceding one in order to bring all the zeros back exactly under their respective openings 99 in the dial, the notches corresponding practically to No. 9 of the drums.

Figure 11:
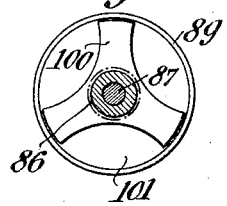
Fig. 11 shows a detail of the day counter.

The rotation of the shaft 87 for the return to zero being prevented by the worm-gear transmission 85 and 86, the following arrangement has been adopted. The pinion 86 is mounted loosely on the shaft 87 and carries a friction spring 100 bearing with strong pressure against a disk 101 (Fig. 11) located inside of the units drum and fast to the shaft 87. In the direction of the normal displacement the shaft 87 is driven by the pinion 86 through the spring 100. On the other hand, for the zero-setting displacement the pinion 86 is held fast by the worm 85, and the drums are capable of being driven in spite of everything provided the knob 76 is turned sufficiently to overcome the pressure of the spring 100 on the disk 101.

It is obvious that, in place of having five drums connected together, as shown in the drawing, there may be more or less drums, the operation remaining the same.

The invention comprises also a modified form of the apparatus described above, which, while based on the same principle, comprises certain modifications which render it suitable for special purposes.

Such modifications relate particularly to:

1. The mechanism for the control of the index hand.

It was stated at the beginning of the specification that the periods of connection and disconnection following each other alternately may be very short, e. g., of one or two seconds' duration, thus admitting of corrections of the hand, if the case should arise, every two or four seconds. But in certain cases it is of advantage that such corrections be made at even shorter intervals of time. But when accurate data is to be obtained it is impossible to make the duration of the periods less than a second.

The modified mechanism for the control of the hand renders it possible to double the frequency of the periods without shortening their duration, and hence to obtain corrections of the hand, if necessary, at intervals of time twice as short as before.

This mechanism is furthermore so constructed as to admit of much greater displacements of the hand than before, e. g., of three or four complete turns of the dial, to the end of measuring speeds capable of attaining 3000 or 4000 revolutions.

2. The addition of a supplemental hand rendered necessary by the great displacements of the speed indicating hand and to show the number of rotations made by the latter in order to obviate all errors in reading when the speed to be measured exceeds 1000 revolutions.

3. The addition of means enabling the apparatus to work whichever may be the direction of rotation of the prime mover the speed of which is to be measured.

The following description referring to Figs. 15 to 28 of the annexed drawing given by way of example will fully explain the characteristics and advantages of this modification.

For the sake of simplicity the speed indicator alone is shown in this drawing, but it is obvious that it may in this modified form, as in the former case, be combined with a time indicator, a counter and a totalizer.

The movement of the prime mover the speed of which is to be ascertained—e. g., the shaft of a motor—is transmitted to the counter, with or without reduction, by means of the shaft 1' carrying a bevel pinion 2' meshing with a bevel wheel 3' (Fig. 15), which, by means of a series of spur gears 4', 5', 6', 7', 8', 9', 10', 11', 12' and 13', (Fig. 17) located between the front plate $a'$ and an intermediate plate $b'$, drives the barrel 14' and the mechanism actuating the index hand, which are held between the intermediate plate $b'$ and a rear plate $c'$.

The barrel 14' is constructed and acts in the same manner as before. By means of its toothed periphery 15', pinion 16', shaft 17' and whip-lever 18' acting on the star wheel 19', it drives its regulating mechanism A' carrying in the usual manner an escapement wheel, a pallet and a spiral balance. The barrel 14' is always slidingly mounted on its shaft being driven frictionally and is surmounted by a cam 20' carrying studs 21' which form a lantern pinion. But the profile of said cam and the whole mechanism which controls the hand B', on which it acts either directly or through its studs 21', are modified as will be explained below.

The studs 21', upon the intermittent movement imparted to the barrel 14' as a result of the escapement of the whip-lever 18', cause the oscillation of a bellcrank lever 22' fulcrumed at 23' and returned by a leaf spring 24'.

Said lever 22' forms movable bearings for one end of each of two shafts 25' and 26' located at equal distances in both directions from the pivotal point 23' their other ends being pivotally mounted with a certain play in the front plate $a'$.

Each of said shafts carries a light steel gear 27' and 28' (Figs. 16 and 30) respectively having very fine teeth and at its lower end a pinion 12' and 13' (Fig. 17) respectively (previously mentioned) which insures its drive by the prime mover the speed of which is to be measured.

It will be readily understood that the shafts 25' and 26', by reason of the displacements due to the oscillations of the lever 22'; execute in their turn periodical oscillatory movements in opposite directions as indicated by the arrows in Fig. 18.

The gears 27' and 28' are located at different heights opposite the wheels 29' and 30', which are loosely mounted on the spindle 31' of the speed indicating hand B', which moves over the dial 32'.

The result of the periodical oscillatory movements of the shafts 25' and 26' in opposite directions is to cause simultaneously either the engagement of the wheels 27' and 29' and the disengagement of the wheels 28' and 30', or the disengagement of the wheels 27' and 29' and the engagement of the wheels 28' and 30' (Figs. 15, 16 and 18). It will thus be seen that a complete forward and return stroke of the lever 22', which before would have resulted in one uncoupling and one coupling operation, causes during the same length of time two coupling and two uncoupling operations the duration of which has not been reduced.

Between the wheels 29' and 30', and keyed to the shaft 31', is a similar wheel 34', to the two faces of which are secured the hubs 35' and 36', each carrying a tooth which engages in a corresponding Maltese cross 37' or 38' respectively, (see Fig. 23 for 35' and 37'). Each Maltese cross is mounted loosely on a pin, these pins being carried by the wheels 29' and 30' respectively. Each of said Maltese crosses has three teeth and a plain part forming a stop in both directions, so as to permit the relative displacements between the wheels 29' and 30' and the wheel 34', capable of three rotations (Figs. 18 and 23). The two pins of the parts 35' and 36' are aligned, and when the hand B' is at zero the Maltese crosses occupy the position indicated in Fig. 23 and stop the further turning of the hand.

On the wheels 29', 34' and 30' act pawls 41', 42' and 43' respectively, which are pressed up by a triple-leaf spring 44'. Said pawls are controlled by means of a pin 45' (Fig. 16) carried by the rocking arm 46' (Fig. 15) pivoted at 40', returned by a spring 47' and actuated by the cam 20' (Figs. 15, 16, 20, 21 and 22). The pawls act on their respective wheels in a manner which will be explained below and which is determined by the shape of their rear branches and by the profile of the cam 20'.

Two toothed sectors 50' and 51', (Fig 16) returned by springs 52' and 53' and pivotally mounted on a shaft 54', mesh with pinions 48' and 49', fast to the wheels 29' and 30'. Another toothed sector 39', (Fig. 15) pivoted at 55' to the plate $c'$ and returned by a spring 56', meshes with a pinion 33' keyed on the central shaft 31'. Each of the sectors 50' and 51' carries a tooth 57' forming a spring and designed to insure to said sectors, by a wedging action on the corresponding pinion 48' and 49', an invariable position at the end of their return stroke. The three sectors 50', 51' and 39' tend to return the wheels 29', 30' and 34' to the position corresponding to the zero position of the hand in the direction of the arrow (Fig. 20).

The operation of the mechanism for the control of the speed indicating hand B' described above may be resolved into four phases of equal duration, as indicated diagrammatically in Figs. 25 to 28, at the rate of two for each position of the lever 22'. This operation is effected in the following manner:

*First phase* (Fig. 25).—The gear 27' has been brought into engagement with the corresponding wheel 29' which it drives in the direction of the arrow. The pawls 41' and 42' are separated from their respective wheels 29' and 34', while the pawl 43' is in contact with the wheel 30'. If the hand B' was at zero at the beginning of the phase the wheel 34' is at once driven by the wheel 29', acting by means of its Maltese cross. If, on the other hand, the hand B' occupied a position indicating a certain speed, and the wheel 29' has not moved a sufficient distance to drive the wheel 34' (that is to say, if there has been a reduction in speed between the two preceding periods of coupling), the wheel 34' may, under the spring thrust of its sector 39', work on the wheel 30' which is held by the pawl 43' in the position of maximum displacement which it occupied at the end of the preceding phase.

*Second phase* (Fig. 26).—The gear 27' is still in engagement with the wheel 29'. The pawls 41' and 42' are in contact with their respective wheels 29' and 34', while the pawl 43' is separated from its wheel 30'. The wheel 34' continues to be driven by the wheel 29', the pawls enabling the displacement of the wheels in the direction of forward movement. The wheel 30', under the action of its sector 51', returns to zero if required.

*Third phase* (Fig. 27).—The gear 27' has been disengaged, while the gear 28' is brought into mesh with the wheel 30'. The pawl 41' is in engagement with its wheel 29', while the pawls 42' and 43' are separated from their respective wheels 34' and 30'. At first the wheel 30' is driven and then the wheel 34', in case the displacement exceeds that previously imparted by the wheel 29', which is held by its pawl 41' in the position of maximum displacement which it occupied at the end of the preceding phase.

*Fourth phase* (Fig. 28).—The gear 28' is still in mesh with the wheel 30'. The pawl 41' is separated from its wheel 29', while the pawls 42' and 43' are in engagement with their respective wheels 34' and 30'. Wheel 34' continues to be driven by the wheel 30'. Wheel 29' returns to zero under the action of its sector 50'.

To insure the stability of the hand B'— i. e., to prevent it from fluctuating at the moment of its displacements—said hand, in place of being keyed directly on the shaft 31', is secured to a small sleeve which is loosely mounted on said shaft and forms the hub of a disk 58'. Said disk has a hole in which a pin 59' engages with a certain play, said pin being carried by a small plate 60' secured to the shaft 31'. Moreover, said disk 58' is slightly braked by a flat spring 61' acting on its periphery, into which a notch 62' is cut which determines in a very accurate manner the position of the hand B' corresponding to zero (Figs. 18 and 19). This device is located inside of the plate a' and held in place therein by a small bridge.

The dial 32' is always divided into 100 equal parts, each corresponding to ten revolutions of the prime mover the speed of which is to be measured. A displacement of the hand B' equal to a complete rotation thus corresponds to a speed of 1000 revolutions a minute. As the hand B', owing to the method of connection by Maltese crosses, is capable of making three complete turns of the dial it is necessary, in order to obviate all errors in reading when the speed exceeds 1000 revolutions, to indicate the number of rotations made by said hand. To that end the dial carries also a divided sector over which moves a supplemental hand C' (Fig. 24). Said hand C' is controlled, with suitable reduction, by a pinion 64' fast to the shaft 31', a toothed sector 65' and gears 66' and 67', the latter of which is keyed on the shaft of the hand C' (Fig. 16).

Finally, to enable the apparatus to work whichever may be the direction of rotation of the prime mover the speed of which is to be measured, there is mounted with gentle friction on the shaft 68', (on which are mounted the wheels 3' and 4'), a lever 69' having an arm on which is loosely mounted a small toothed wheel 5' meshing on the one hand with the wheel 4' and on the other hand with a similar small toothed wheel 6' pivotally mounted on a movable arm 70' pivoted to the same stud as the wheel 5'. The displacements of the members 69' and 70' are limited by fixed stops 71', 72' and 73'. It will be seen (Fig. 17) that with this arrangement, the wheel 4' rotating, e. g., in the direction of the arrow d', the members 69' and 70' will come to occupy the position indicated in full lines, and that the wheel 7' will be driven by means of the wheels 5' and 6' in the direction of the arrow e'. If, on the other hand, the wheel 4' rotates in the direction of the arrow f' the members 69' and 70' will come to occupy the position indicated in dotted lines, and the wheel 7' will then be driven only by the wheel 5', but still in the direction of the arrow e'.

Finally, to reduce the number of parts and to facilitate the assembling of the modification last above described, the three actuating pawls and the double-acting lever may also be controlled directly by a series (block) of cams secured to the barrel.

The following description referring to Figs. 29 and 30 which is given by way of example, will fully explain the manner in which this result may be attained.

According to the improvement the three pawls 41', 42' and 43', returned by the triple-leaf spring 44', and driving wheels 29', 34' and 30' as well as the double-acting lever 22' controlling the shafts 25' and 26' of the wheels 27' and 28', are actuated directly by a series of cams 75' secured to the barrel 14' and surmounting the latter.

Said series (block) of cams may be formed either of milled disks joined together or of a single cylindrical milled part.

The teeth are of course cut to such number and of such shape and pitch as to insure an operation of the pawls 41', 42' and 43' and of the double-acting lever 22' similar to that described in the preceding modification.

To enable the pawls 41', 42' and 43' to be controlled directly by the series of cams 75' without changing the arrangement of the remaining parts, they have been made to occupy a position opposite to that which they occupied before and their heads have been given the shape of hooks instead of the straight form. Furthermore, the end of the tail piece of said pawls and that of the double-acting lever are adapted to the new method of control by cams, substituted for the former control by pins or studs 21' and 45'.

I claim:

1. A periodical speed indicator comprising indicating and controlling wheels, a Maltese cross carried by one wheel, through which the controlling wheel advances the indicating wheel and may advance the same more than one revolution, means for advancing the controlling wheel intermittently from the prime mover, means for restoring it after each advance, timed locking means for alternately holding and freeing such wheels, and a timing mechanism operating such locking means.

2. A periodical speed indicator comprising an indicating wheel, and duplicate controlling wheels, all mounted on the same axis, means for advancing the controlling wheels alternately from the prime mover, means for restoring each after each advance, and transmitting members intervening each controlling wheel and the indicating wheel, whereby the latter is displaced alternately by the controlling wheels.

3. A speed indicator according to claim 2, comprising a spindle carrying an indicating part, the indicating wheel fixed on said spindle, and the controlling wheels loose on said spindle.

4. A periodical speed indicator comprising a rotary member driven at varying speed from the prime mover, an indicating member, controlling means, the latter adapted to advance the indicating member during its advancing movements, driving means coupling to the controlling means for alternately advancing the same intermittently from the prime mover, and freeing it to permit it to return to zero a timing mechanism, ratchet and pawl locking means timed thereby for alternately holding and freeing the indicating member and controlling means, and means for impelling said elements backward when freed, such parts timed to operate in successive phases such that the controlling means is first coupled and advanced and then uncoupled and held in its advanced position, and the indicating member is held against backward movement during such advancing movements of the controlling means, but may be advanced by the latter if it stands in a less advanced position, and is released while the controlling means is held stationary, so that if the latter is less advanced the indicating member may fall back thereto, and the latter is then held and the controlling means released and permitted to return to zero preparatory to a new advance movement.

5. A speed indicator according to claim 2, the transmitting members comprising Maltese crosses, whereby either controlling wheel may advance the indicating wheel for more than one revolution and may then freely return to zero.

6. In a speed indicator having a rotary indicating wheel and means for moving it forward, a sector for turning the rotary wheel backward having a spring-mounted tooth adapted on reaching its starting or zero position to engage its meshing pinion with a wedging action to restore the rotary wheel to an invariable starting position.

7. A speed indicator according to claim 4, the controlling means comprising two controlling members, the driving means coupling them alternately so that they are alternately advanced from the prime mover, the locking means for said members respectively adapted for alternate operation, and the parts timed to operate in successive phases such that when either controlling member is released, the other is held, the indicating member being released successively during the periods while one or other of the respective controlling members is held, whereby the indicating member is positioned by the respective controlling members alternately.

8. A speed indicator according to claim 4, the indicating member comprising a ratchet wheel, and the controlling means comprising two ratchet wheels, said wheels mounted on the same axis, the driving means coupling the controlling wheels alternately, each controlling wheel adapted to advance the indicating wheel, and the locking means comprising pawls for said respective wheels timed to release the controlling wheels alternately and to release the indicating wheel during the periods when the pawls are holding one or other of the controlling wheels.

In witness whereof, I have hereunto signed my name in the presence of two subscribing witnesses.

EDMOND JAEGER.

Witnesses:
CHAS. P. PRESSLY,
HENRI CARTIER.